US006952499B1

(12) United States Patent
Vititoe

(10) Patent No.: US 6,952,499 B1
(45) Date of Patent: Oct. 4, 2005

(54) ASPIRE (AUTONOMOUS SPATIAL PATTERN IDENTIFICATION AND RECOGNITION ALGORITHM)

(75) Inventor: David L. Vititoe, Hanscom AFB, MA (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 1540 days.

(21) Appl. No.: 09/174,649

(22) Filed: Oct. 19, 1998

(51) Int. Cl.[7] ............................................... G06K 9/62
(52) U.S. Cl. ...................................................... 382/224
(58) Field of Search ........................................ 382/224

(56) References Cited

PUBLICATIONS

Wu et al, Adaptive Tree–Structured Subspace Classification of Hyperspectral Images, IEEE, pp 570–593, 1998.*

Jimenez et al, Supervised Classification in High Dimensional Space: Geometrical, Statistical, and Asymptotical Properties of Multivariate Data, IEEE pp 39–54, Feb. 1, 1998.*

* cited by examiner

*Primary Examiner*—Mark Hellner
(74) *Attorney, Agent, or Firm*—William G. Auton

(57) ABSTRACT

An automatic endmember classification algorithm for hyperspectral data cubes. This algorithm is an improved version of a pattern recognition technology which was developed at Massachusetts Institute of Technology (MIT). The MIT algorithm is called the Extended Cross Correlation (XCC) technique, and it was designed to separate patterns from time resolved spectroscopic data. ASPIRE uses XCC as one of its core algorithms, but it features many improvements. These include: the use of Principle Components Analysis (PCA) to preprocess the data, and automatic endmember searching algorithm, and a Bayesian algorithm which is used to unmix the end-members. This invention also represents a new use of the XCC technology, because it had never before been used to identify spatial targets and patterns in hyperspectral data.

4 Claims, 1 Drawing Sheet

Synthetic data set which is composed of two fictitious patterns, A and B.

Synthetic data set which is composed of two fictitious patterns, A and B.

ASPIRE (AUTONOMOUS SPATIAL PATTERN IDENTIFICATION AND RECOGNITION ALGORITHM)

STATEMENT OF GOVERNMENT INTEREST

The invention described herein may be manufactured and used by or for the Government for governmental purposes without tile payment of any royally thereon.

BACKGROUND OF THE INVENTION

The present invention relates generally to pattern recognition systems, and more specifically the invention pertains to an automatic endmember classification algorithm for hyperspectral data cubes. This algorithm has been given the name ASPIRE (Autonomous Spatial pattern Identification and REcognition algorithm).

Much of the pattern recognition data analyzed is complicated, because it often consists of overlapping spectral/spatial patterns which are difficult to separate. When studying the underlying physics and chemistry of this data, it is often necessary to first unmix (or separate) these patterns. By the end of 1997, Steve Coy's group at MIT demonstrated that their pattern recognition algorithm, Extended Cross-Correlation (XCC), can be successfully used to separate an optically thick, v=1, CO band from the other overlapping bands in the spectra. This success has motivated us to produce an in-house capability to use the XCC algorithm.

Prior art pattern recognition techniques are described in the following eight references, the disclosures of which are incorporated herein by reference:

[1] M. P. Jacobson et al. Extended cross-correlation: A technique for spectroscopic pattern recognition. *J. Chem. Phys.*, 1997.
[2] S. L. Coy et al. Identifying patterns in multi-component signals by extended cross-correlation. *J. Chem. Phys.*, 1997.
[3] M. P. Jacobson. Application of numerical pattern recognition to CO atmospheric simulation experiments. *TBD*, 1988. (work in progress).
[4] T. J. Pearson. Pgplot graphics subroutine library. http://astro.caltch.edu/~tjp/pgplot.
[5] Interactive data language. Research System's Inc.
[6] William H. Press et al. *Numerical Recipes in FORTRAN*. Cambridge University Press, 1992.
[7] G. D'Agostini. A multidimensional unfolding method based on bayes' theorem. *DESY* 94–099, 1994.
[8] Harold J. Larson. *Introduction to Probability Theory and Statistical Inference*. John Wiley & sons, 1982.

SUMMARY OF THE INVENTION

The present invention includes an automatic endmember classification algorithm for hyperspectral data cubes. This algorithm has been given the name ASPIRE (Autonomous Spatial Pattern Identification and REcognition algorithm). This algorithm is an improved version of a pattern recognition technology which was developed at Massachusetts Institute of Technology (MIT). The MIT algorithm is called the Extended Cross Correlation (XCC) technique, and it was designed to separate patterns from time resolved spectroscopic data. ASPIRE uses XCC as one of its core algorithms, but it features many improvements. These include: the use of Principle Components Analysis (PCA) to preprocess the data, an automatic endmember searching algorithm, and a Bayesian algorithm which is used to unmix the end-members. This invention also represents a new use of the XCC technology, because it had never before been used to identify spatial targets and patterns in hyperspectral data.

Another aspect of the invention includes a flexible program that has been created to implement the ASPIRE algorithm. The code can be used in either a user interactive mode, or in an automatic batch processing mode. Users interact with the code through a simple command line interface. User commands can also be placed into a text file, called a macro. The code has the ability to execute these macros by performing a line-by-line execution of all the command within the macro. The program also has the ability to display graphical output. The PGPLOT graphics library was used to create all of the graphics produced by the program.

DESCRIPTION OF THE DRAWINGS

FIGS. 1, 1A and 1B are charts of synthetic data sets of two fictitious patterns A and B.

DETAILED DESCRIPTION OF THE PREFERRED EMBODIMENT

Figure 1:
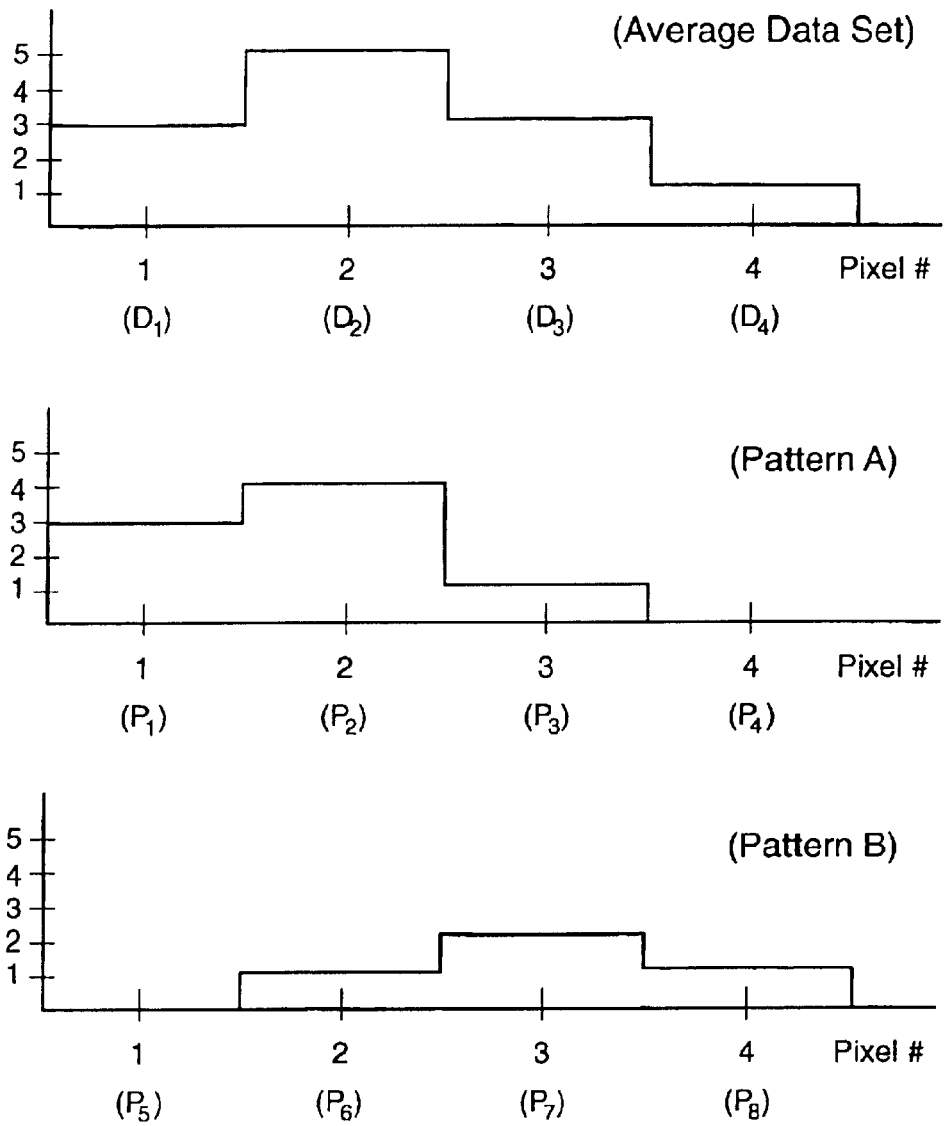

As mentioned above, the present invention includes an automatic endmember classification algorithm for hyperspectral data cubes. This algorithm has been given the name ASPIRE (Autonomous Spatial Pattern Identification and REcognition algorithm). This algorithm is an improved version of a pattern recognition technology which was developed at Massachusetts Institute of Technology (MIT). The MIT algorithm is called the Extended Cross Correlation (XCC) technique, and it was designed to separate patterns from time resolved spectroscopic data. ASPIRE uses XCC as one of its core algorithms, but it features many improvements. These include: the use of Principle Components Analysis (PCA) to preprocess the data, an automatic endmember searching algorithm, and a Bayesian algorithm which is used to unmix the end-members. This invention also represents a new use of the XCC technology, because it had never before been used to identify spatial targets in hyperspectral data.

In this description, it is assumed that the reader is familiar with the XCC technique. If this is not the case, I highly recommend reading the MIT documents mentioned above before continuing this literature, which is solely devoted to describing the LABCEDE implementation of the XCC algorithm. This implementation consists of a flexible FORTRAN program which is currently designed to run on a Unix based workstation. The discussion below gives a description of how to use this program as well as some practical examples. The program has been used in several different analyses. Two of the most prominent analyses are the analysis of the LABCEDE CO data, and the analysis of HYDICE hyperspectral data cubes.

The technical details about the code have been place into the appendix. These sections refer to the overall structure of the code, as well as the details as to how the code performs the pattern unmixing.

The program written to execute the XCC algorithm has been named, appropriately, XCC. This program was written and designed with the following goals in mind:
Must be portable.
Must be flexible enough to quickly analyze a wide variety of data.
Must have the ability to automate repetitive analysis.
Must have a flexible user interface.

It was decided that XCC would be written in FORTRAN 77 since some compilers for this language are available on many different platforms. XCC uses the PGPLOT graphics library to produce all of its plots and images. These routines are a collection of FORTAN subroutines which give one the ability to easily produce graphical output.

A flexible user interface was essential for XCC. This is due to the fact that the user must have the ability to analyze a variety of different data sets, and have the ability to tailor the application to the specific needs of the analysis. Therefore, it was decided that XCC should have a command line interface which is similar in look and feel to IDL. This gives the user complete flexibility in how the analysis is performed. A listing of the available XCC commands are given below.

XCC has the ability to process data in an automated fashion. Once an initial analysis of a data set has been performed, the XCC commands necessary to perform this analysis can be placed into an ASCII text file. This file (called a macro) can be used by XCC in future analysis. When executing a macro, XCC reads the file line-by-line executing each command. Therefore, repeated experiments can be quickly processed by simply executing the appropriate macro. Furthermore, every time XCC is run, the macro 'last. mac' is created. This macro contains a listing of every command which was used during the most recent XCC session. This file can be used to record one's work for future reference, or as a way of creating a macro for future use.

Two versions of XCC have been produced: LARGE and SMALL. The SMALL version is the original program which was designed to handle the relatively small data sets produced at the LABCEDE facility. The LARGE version is a modified version which has been designed to handle extremely large hyperspectral data sets. To accommodate these large data sets, several of the features available in the SMALL version were removed from the LARGE version. The discussion below gives a listing of which XCC commands are not available in the LARGE version. A more detailed description of the differences between the LARGE and SMALL versions of the FORTRAN code are given in Appendix A.

Thus far, XCC has only been tested on a DEC Alpha platform using the Unix operating system. In the future, it may become necessary to port the code to other platforms, but this has not yet been accomplished. Before compiling XCC, the PGPLOT graphical subroutine library must be installed. Detailed information on the installation of this package can be obtained over the Internet. Compiling the XCC executable consists of the following steps.

1. change to the XCC source code directory. Edit the file 'menu.inc'. In this file will be the lines.

```
c
c    Help file information
c
     integer PATHL
     parameter(PATHL = 23)
     character*(PATHL) help_path
     data help_path/'/data2/vititoe/XCC/doc/'/
```

The variable help_path gives the directory which contains the XCC documentation files. In this directory will be the files, menu.tex and xcc_help.tex. These files, which have been used to create this document, are also used by XCC to display interactive help information. If necessary, update help_path.

2. Edit the Makefile so that the variable PGPDIR points to the location of the PGPLOT libraries. This variable declaration should be found at the top of the Makefile.

3. Type 'make clean' to erase all of the stale object files.

4. To create the LARGE version of XCC type 'make large'. Alternatively, type 'make small' to create the SMALL version of the code. This sets up the Makefile so that a production version of the executable will be created. If one wishes to create a debugging version of the code, then one should use the commands 'make large' and 'make dsmall' respectively.

5. Create the executable with the command 'make xcc'. This will create the binary file, xcc, in the source directory.

6. Copy the binary file into a directory which can be accessed by others. A good choice for this is /usr/local/bin/. Everyone wishing to use XCC should have this directory in their PATH.

XCC is a flexible program which accepts commands through it's command line interface. Executing the code gives one the following: irwin.plh.af.mil>xcc

```
*********************************************
*                                           *
*          XCC Pattern Identifier           *
*          ----------------------           *
*                                           *
*              (Large Version)              *
*                                           *
*********************************************
```

XCC>

As mentioned earlier, there are two version of this code, LARGE and SMALL. The above example is taken from the LARGE version of the code and is clearly marked as such. Had this been the SMALL version, it would have been marked accordingly.

The following two sections list all of the XCC commands. These commands have been split into two sections. The first lists all menu specific commands. Commands which relate to the XCC recognition algorithm are given below.

In each of these sections, the following conventions shall be used:

command (req1) (req2) [opt]

The name of the 'command' is given first and is followed by various required and optional qualifiers. The qualifiers contained within parentheses, '( )', are required. If this information is not supplied on the command line, XCC with interactively prompt the user for this information. Qualifiers which are enclosed within brackets, '[ ]', are optional. This naming convention will be used throughout the following two sections.

Examples of how these menu commands can be used to analyze data are given below. In these sections, the XCC program will be demonstrated with a LABCEDE CO data set and a HYDICE hypercube respectively.

The following commands manipulate the menu system. They do not alter, display, or interact in any way with the data being manipulated by XCC.

exec (filen)

filen: The macro filename

This command is used to execute a macro. A macro is an ASCII file which contains a listing of XCC commands. When the command 'exec' is issued, XCC reads (filen) line-by-line, executing each command in sequence.

Comments can be include in a macro file. Any line beginning with a pound sign '#' is ignored by XCC.

exit help [cmnd]

cmnd: (optional) XCC command

Typing 'help' without the optional [cmnd] lists all of the available XCC commands. Help for a specific command can be found via 'help [cmnd]'.

pause

Pauses the execution of XCC. This command provides a method for pausing the execution of a macro. Once the 'pause' command has been issued, the prompt "Press <ENTER>" will be given. Pressing <ENTER> causes the macro to continue. Typing "<q<ENTER>" aborts the macro execution.

quit

Used to exit the XCC program. (An alternative to 'exit').

Each of the commands in this section are designed to help one analyze data with the XCC pattern recognition algorithms.

cut (pos)

pos: The vertical position of the cut.

Whenever a 2-D image is displayed, a horizontal red line is plotted on top of the image. This line represents a one dimensional cut through the data. [o]plot displays the intensity of the pixels which lie along this line.

The 'cut' command is used to move the cut line. The easiest way to do this is to issue the cut command and interactively click on the location of the new cut line.

dump

Dumps the 2-D XCC weight images to a file. The results are placed into weights.ps.

delete (val)

val: The XCC direction angle ID number.

'delete' is used to erase XCC direction vectors (endmembers) from memory. The 'list' command can be used to display the vectors currently stored in memory along, with there respective ID numbers (val). Using 'delete −1' forces XCC to erase all direction vectors from memory.

hold (type) (first) [last]

type: The type of function being held constant: 'basis' or 'pattern' first: ID number of the first function to be held constant last: (optional) ID number of the last function to be held constant During pattern unmixing, both the basis functions and patterns are allowed to vary. The 'Hold' command can be used change this behavior by forcing any number of these functions to be held constant during the fitting process. An individual function can be held constant by specifying it's ID number as (first). A range of functions can be specified by giving the (first) and [last] spectrum ID number. Alternatively, specifying (first) as −1 toggles the holding status of all the functions of that type.

image (type) [num1] [num2]
  bad: Displays image of pixels not fit by 'xcc search'
  crop: Crops the RGB image
  depth: Plots the spectrum associated with one of the image pixels
  pattern: Displays image of a pattern
  rgb: Displays a false color RGB image
  weights: Displays image of XCC weights The 'image' command is used to display and manipulate two dimensional images. A brief description of each command is given above. Some of the commands use the optional [num1] and [num2]. However, if not supplied, XCC will interactively prompt the user for the this information.

input

This command gives the user a way to manually enter an XCC direction vector into memory. Simply type 'input' and XCC will prompt the user for all the necessary information. NOTE: this command is recommended only for testing small direction vectors.

label (xlab) (ylab) [header]

xlab: Label for the horizontal axis ylab: Label for the vertical axis header: (optional) Title for the plot The 'label' command is used to label the axis of the current plot. Note that each of the labels may contain spaces so long as the strings are enclosed within quotes. For example:
  label "X axis" intensity "Plot 1"

Here, the vertical axis label, intensity, did not need to be quoted since it was a single word.

limits (llim) [ulim]

llim: Lower limit ulim: (optional) Upper limit

This command is used to change the limits used by XCC. These limits are used in various ways by XCC including: displaying plots, calculating XCC direction angles, and unmixing patterns.

The upper and lower limits are set by specifying (llim) and [ulim] respectively. The limits can be reset to it's originally values by specifying that (llim) be −1. If (llim) and [ulim] are not specified on the command line, XCC will prompt the user for the information.

list

Lists useful information about the parameters and data being stored in memory.

load (type) (filenm)

type: Specifies the type of data being loaded. Possible types include: basis, binary, data, labels, parameters, and patterns.

(filenm): The name of the file containing the data.

The 'load' command is used to read data from file and load it into memory. The basis, data, and patterns files consist of ASCII files with columns of numbers, where the number of columns is equal to the number of patterns (spectra etc.) and the number of rows is equal to the number of elements (or bins).

The 'labels' are simply a single column of numbers. The labels are used to scale the horizontal axis in the ID plots.

The 'parameters' file type reads ASCII data which has been saved in the special format used by the 'save parameters' command.

The load command is used somewhat differently for 'binary' files. A template for this is:
  binary data file dat numx numy numz It is assumed that the data contained in file.dat are real numbers.

move (num)

move: Pattern ID number

This command can be used to turn a pattern into a basis function. This can sometimes be useful when performing large and complicated XCC fits. Once one has decided that a pattern has converged, the 'move' command can be used to turn it into a basis function. From that point on, the shape of this new basis function is fixed, and only it's normalization is allowed to vary during future XCC fits.

pca (num)

This command performs a Principal Components transformation on the data. This transformation is useful in that it can greatly reduce the dimensionality of the data. The parameter (num) has multiple uses. If (num) is an integer, then (num) specifies the number of transformed components that will be kept. If (num) is a fraction, then this represents the fractional amount of signal that is to be kept. In other words, setting (num) to 0.9 means that only 90% of the original signal must be present in the transformed data.

[LARGE VERSION ONLY] The memory buffers which are normally used to store patterns must be used as a workspace during the PCA transformation. Therefore, using the 'pca' command will erase all of the patterns currently stored in memory.

[o]plot (type) (ID1) [ID2]

type: The type of distribution to be plotted. The possible types are:
  basis: Basis functions
  depth: Time dependence of a given resolution point.
  difference: The total fit spectrum (Basis+Pattern) subtracted from the original data.
  ebasis: The error associated with each basis function.
  patterns: The unmixed patterns
  epatterns: The errors associated with the patterns.
  recursion: Two dimensional recursion map
  spectra: The data
  total: The fit basis functions plus patterns
  weights: The differential XCC weights
  xcc: The total XCC weights ID1: First spectrum ID number ID2: (optional) Last spectrum ID number By specifying [ID2], all spectra from (ID1) to [ID2] will be plotted on the same graph. plot creates a new graph, while 'oplot' overlays plots onto the existing coordinate system.

ps (action) [file]

action: Two actions are available: open and close.

file: (optional) The file name for the postscript file being opened.

This command is used to open and close a postscript file. Once opened, all of the 1D plots displayed on the screen will be copied to [file]. If [file] is not specified, the default name, xcc.ps will be used.

reduce (dist)

dist: Euclidean distance

The 'reduce' command can be used to reduce redundant XCC direction vectors. The vectors are first normalized to unit length. They are then treated as points and the Euclidean distance between these points are calculated. If a pair is found to be closer than (dist), one of the two vectors is eliminated.

reset

Reset the XCC code. All parameters and data are erased from memory, and the graphics windows are restarted.

save (type) (filenm)

type: The types of data that can be saved to disk include: 'basis', 'binary', 'data', 'parameters', and 'patterns'.

filenm: The ASCII file name

The 'save' command is used to write data into an ASCII file. Further information about the format of each file type can be found in the help information for the 'load' command.

split (hpart) (vpart)

hpart: Number of horizontal partitions vpart: Number of vertical partitions

Splits the 1D graphics window into sub-windows. This gives the user the ability to display more than one plot in the same graphics window.

tolerance (val)

val: The value of the XCC tolerance parameter

This command is used to adjust the XCC tolerance parameter. Smaller values will tighten the local search window used during XCC fits.

unfold (type) [param]

param: (optional)

type: Specifies the type of unfolding that is to be performed. Four types are available:
  bayes: Uses Bayesian statistics to unfold the data. [param] is not used.
  positive: Non-linear least-squares fitting technique which forces the results to always be positive. Note that this method requires good starting values for the parameters. Therefore, this option can only be used after an 'unfold svd' command has been successfully issued. This method is non-linear and iterative. [param] can be used to specify a maximum number of iterations.
  svd: Linear least-squares fitting technique which uses Singular Value Decomposition as its core algorithm. [param] is used to reset the threshold value for svdfit( ) (See numerical recipes for more details).}

This command is used to unfold (or unmix) the basis functions and patterns from the data. Three methods are available, and each are described above.

xcc (type)

type: Four possible types:
  current: Uses the direction vectors currently stored in memory as starting points for the next set of integrations.
  grid: Uses an N-dimensional grid of points as the starting points for the integration.
  ladder: Simple minded automatic searching algorithm. See Appendix B of the XCC document for more details.
  search: A more sophisticated automatic searching algorithm. See Appendix B of the XCC document for more details.

This command is used to determine the XCC direction vectors. At the core of this algorithm is the N-dimensional integration routine, powell( ). This type of integration requires one to specify an initial starting point in the N-dimensional parameter space. Each of the (type)'s described above give different methods for specifying these points.

zero (type) [llim] [ulim]

type: The function being zeroed: 'basis' or 'pattern' llim: (optional) The lower limit of the portion being zeroed ulim: (optional) The upper limit of the portion being zeroed This function is used to zero out portions of a spectrum (basis or pattern) that is stored in memory. If the optional [llim] and [ulim] are not supplied on the command line, then XCC will request that the user enter these limits interactively.

The following example demonstrates how XCC can been used to analyze HYDICE hyperspectral data cubes. The data used in this demonstration was taken from the Forest Radiance 1 experiment. This data contains 320×640 pixels with each pixel containing 210 spectral bands. This is an enormous amount of data, therefore, the LARGE version of XCC was used to analyze this data set. Atmospheric corrections have been applied to the cube via the Empirical Line Method which uses calibration panels of known reflectance to remove atmospheric effects from the image.

This data set can be fully analyzed by issuing the following XCC commands:
tol 0.0035
load binary data hydice.dat 320 640 210
image rgb
image crop
image rgb
mask load water
mask apply
pca 15
xcc search
image w 1
unf bayes
image pat 1

The tolerance of 0.0035 was somewhat arbitrarily chosen. In an ideal situation, this parameter should be chosen so that it represents the noise present in the data. For this data, 0.0035 was chosen because it forced 'xcc_search' to produce a reasonable number of patterns. In general, whenever dealing with a new data set, one must play with this parameter until reasonable results are achieved. Once this is accomplished, the resulting tolerance can be used in all subsequent data sets.

It is not shown in FIG. 1, but there are rows of dead pixels along the top and bottom of this figure. The 'image crop' command is used to cut off these pixels. The 'crop' command can also be used to zoom in on sub-regions of the data cube. The two 'mask' commands are used to cut out the 'water bands' in the spectra. These spectral bands contain very little useful information, therefore they are eliminated. The file, water.mask is:
99
111
136
154
Therefore, bands 99-11 and 136-154 are removed from the data.

Finally, 'pca 15' is used to reduce the dimensionality of the problem down to 15. This is followed by 'xcc search' which autonomously searches for the endmembers. This command is described in detail in Appendix C.2. The last step, 'unf bayes', unmixes all of the patterns via the Bayesian unmixing technique described in Appendix C.2. The Bayesian approach was chosen because it constrains the patterns such that they are always positive, and it performs the necessary calculations much more quickly than the analogous non-linear least-squares techniques (Appendix C.1).

XCC manages to process this data set fairly quickly. On average it takes 15 minute to perform the PCA transformation while an additional 10 minutes is needed to perform the Bayesian unmixing. Thus, 25 minutes is required to fully unmix a HYDICE data cube such as this. However, if one is interested only in assigning pixels to it's 'closest class', then only 15 minutes are required.

It should be noted that XCC misidentifies some of the grass as trees. In actuality, the spectra for the grass in that region is very similar to the average tree spectra. Therefore, XCC has difficulty telling the two apart. It is possible to decrease the tolerance parameter and produce completely separate tree and grass classes. However, it was generally found that this results in too many unphysical patterns.

The original design for the XCC code placed the code for the menu systems, graphics displays, and algorithms into their own separate modules. A module, in this context, is a self-contained code segment which has a clear interface through which other modules may interact. All of the module implementation details are contained within the modules and are irrelevant as far as other modules are concerned.

This design was chosen because it makes future code upgrades easier. It also makes code debugging simpler in that problems are usually contained within a module. I had a mixed amount of success with maintaining this design goal. Unfortunately the FORTRAN 77 language does not directly support this type of modular design. Therefore, I have found that it was often difficult to maintain this design goal. Another problem I ran into was a lack of the time. Very often, I had to come up with quick code changes to test out new algorithm designs. Unfortunately, I never had sufficient time to go back and 'clean up' the code. The current state of the code is that there is one well defined module, the command line menu system, along, with several other loosely defined modules.

The source code for the command line interpreter module is contained within the file menu.F, and the interface for this module is contained within menu.inc. This module has only one subroutine which should be called, menu (prompt), where prompt is the character string which is displayed by the command line prompt. This routine reads the commands supplied by the user, and then parses the commands into strings, reals, and integers. The parsed commands are then passed to the subroutine main_control( ). This routine is responsible for properly interpreting these commands and executing them as necessary.

The remainder of the code segments are split among several different files according to the functionality of each subroutine. However, these code segments are not modular in that clearly defined interfaces between the segments do not exist. Further, the segments often share common data blocks which makes it impossible to properly hide module implementation details. The reason for this is simply that I didn't have time to do this correctly. One of the problems with using a lot of global variables, is that coding changes in one section of the code also effects all of the other 'modules'.

The easiest way to figure out how this code works is to begin by studying xcc_menu.F. In here, the subroutine main_control( ) reads the parsed commands (such as plot, load, and unfold) and then transfers control to the subroutine which executes the request. As an example, one will find that main_control( ) calls the subroutine menu_plot( ) whenever it receives the plot command. To learn how XCC creates plots, one would then study menu_plot( ).

The following describes each of the source files used by XCC:

xcc.F: The main program which does little more than display some information on the screen before transferring control to the menu module.

xcc_menu.F: Contains the menu hock main_control( ) which calls the subroutines necessary to execute the parsed commands.

bayesXCC.F: Contains the code needed to perform the Bayesian unmixing.

data.F: Miscellaneous XCC algorithms and subroutines.

graphics.F: Subroutines which control graphical output. The PGPLOT library is used to create all of XCC's graphics.

image.F: Subroutines which control the display of images.

nrecip.F: Numerical Recipes [6] subroutines which have been modified for use by XCC.

util.F: Miscellaneous utilities.

unfold.F: Algorithms responsible for unmixing the patterns.

In addition, the are several included files which are used by the above files. These include:

bayesXCC.inc: Common block used by bayesXCC.F.

data.inc: Common block used to store XCC data.

equiv_lg.inc: Equivalences used by the LARGE version of the XCC code.

menu.inc: The interface to the menu module.

param.inc: Adjustable parameters for the SMALL version of XCC.

param_lg.inc: Adjustable parameters for the LARGE version of XCC.

studio.inc: LUN definitions for the Unix stdin, stdout, and stderr pipes.

wrksp.inc: Definition of the large memory workspaces used by the various XCC algorithms.

The command 'xcc search' can be used to automatically search for pattern direction vectors. This searching algorithm is designed to work with very large data sets which contain patterns which are not heavily overlapped. This section describes the details of how this algorithm works.

At the core of the XCC algorithm is the N-dimensional integration routine, POWELL. One of the inputs to this routine is an N-dimensional point from which to begin searching, for the merit function maxima, The question then becomes, how does one chose a set of reasonable starting points for the integration routine.

The simplest method involves setting up a grid of points in the N-dimensional recursion space. However, this method grows very cumbersome as the number of dimensions increases. If one chooses to place m points per dimension. Then the number of grid points is $m^V$. Therefore, this searching algorithm dramatically slows down as the number of dimensions increase.

An additional problem arises with very large data sets, because the amount of time needed to maximize the merit function increases with the number of data points. Typical hyperspectral cubes have more than 200,000 pixels. Therefore, for these data sets each call of POWELL is rather slow.

The 'xcc search' algorithm is designed to circumvent these problems by reducing the number of data points being integrated over at any particular time and reducing the number of integration starting points. The algorithm consists of the following steps.

1. Load the first 50 points of the data cube into a buffer, B.
2. Use the first point in B as the starting point for POWELL. Using only the points contained in B, find an XCC direction vector.
3. Given this direction vector, find all of the points in the full hypercube which have non-zero XCC weights. It is assumed that all of these points are described by the direction vector. Therefore, these points are removed from further consideration. If five or more points have non-zero weights, the direction vector is recorded. If fewer than five points have non-zero weights, the direction vector is discarded.
4. Re-fill the buffer, B, from the remaining points in the hypercube.
5. Repeat steps 2–4 until finished.

Instead of integrating over all the points in the data set, a smaller set of 50 points is used. Integrating over the entire data set gives one hundreds (if not thousands) of points which lie along a given direction vector. Clearly, the slope of this line is described almost as well with only a handful of points (5 or more). Steps 1 and 2 are designed to implement this idea.

Once, the direction vector has been located, it is in our best interest to find all other points which lie along this vector (Step 3). Once these points are known, there is no point in processing them any further. Therefore, the are removed from further consideration.

At this point, one simply re-fills the buffer with a new set of points. By definition, none of these points are described by any of the direction vectors found thus far. Therefore, repeating steps 2–4 with this new buffer is guaranteed to find a new direction vector.

In general, I have found that this algorithm works very well. The primary thing to consider when using this method is that it may find extraneous direction vectors. An example of this can be seen in the Hydice example described. Here, roads and grass pixels were assigned classes. However, an extra class was assigned to many of the pixels which fall along the road/grass boundary. Once the road and grass pixels are classified, there area a number of pixels remaining which consist of road/grass mixed spectra. Since there are more than five of these pixels, they are assigned their own class.

I do have an idea on how to eliminate these extra classes, but I have not had time to test it. If we have three direction vectors which describe road, grass, and road/grass mixed classes. then it is reasonable to expect these direction vectors to be co-planer. This is expected because the class is just a linear combination of the first two. Therefore, it is conceivable that one could reduce extraneous classes be searching for co-planer direction vectors. Given three such vectors, which are 'close' in spectral angle, the central one should be removed.

The measured data and patterns can be expressed mathematically as:

$$I_i^j = a_i J_A^j + b_i J_B^j + c_i J_C^j + \quad (1)$$

where $I_i^j$ is the $i^{th}$ measured spectrum at the $j^{th}$ resolution point, $J_A$ is pattern A at the $j^{th}$ resolution point, and $a_i$ is a scalar giving the amount of pattern A that contributes to measured spectrum i. Similarly, $J_B$, $J_C$, $b_i$, and $b_i$ and $c_i$ have analogous meanings for patterns B and C. Depending, on the type of unmixing being performed, either the coefficients, $a_i$, or the patterns, $J_A^j$, can be the free parameters which are determined by the unmixing technique.

The purpose of this section is to give detailed information on how the XCC program performs this unmixing. Instead of dealing directly with Eq. 1, a more concrete example will be used. Once this example is understood, it should be clear how to generalize the method to more general cases. In this example we will assume that there are 3 resolution points in each spectrum 3 measured spectra 2 unknown patterns 2 known basis functions.

Least-squares fitting techniques are an effective way of unmixing patterns from data. Two different fitting techniques are used by the XCC program. The first is a linear technique that uses Singular Value Decomposition (SVD) as its core algorithm. This is a very effective method, because it gives one the ability to systematically remove singularities which may corrupt the fit. One of the problems with the linear method is that it is impossible to easily constrain the parameters being fit. An alternative approach, which is presented here, uses a non-linear fitting algorithm to constrain the free parameters.

This problem is greatly simplified if we are only fitting for patterns. In this case, Eq. 1 reduces to $$\begin{bmatrix} I_1^1 \\ I_2^1 \\ I_3^1 \end{bmatrix} = \begin{bmatrix} a_1 & b_1 \\ a_2 & b_2 \\ a_3 & b_3 \end{bmatrix} \begin{bmatrix} J_A^j \\ J_B^j \end{bmatrix} \quad (2)$$

Notice that coefficient matrix is independent of j, the number of resolution points. To solve this least-squares problem:

1. Calculate the coefficient matrix (shown above). Note that this matrix only needs to be calculated once, since this same matrix is valid at all resolution points.
2. Use the Numerical Recipes [6] subroutine SVDCMP to calculate the singular value decomposition of this matrix
3. Remove 'singular' eigenvalues from the decomposed matrix. See Numerical Recipes [6] (page 57) for an explanation of this step.
4. At each resolution point, use SVBKSB [6] to solve for the vector $[J_A^j, J_B^j]$. Since SVDCMP is called only once, this algorithm runs very quickly.

Similarly, if one is only fitting basis functions, then Eq. 1 can be expressed as $$\begin{bmatrix} I_i^1 \\ I_i^2 \\ I_i^3 \end{bmatrix} = \begin{bmatrix} J_A^1 & J_B^1 \\ J_A^2 & J_B^2 \\ J_A^3 & J_B^3 \end{bmatrix} \begin{bmatrix} a_i \\ b_i \end{bmatrix} \quad (3)$$

In this case, the 'coefficient' matrix contains the basis functions. This matrix is independent of i, the number of measured spectra. Therefore, one simply computes the singular value decomposition of the matrix, then loop over all of the measured spectra using SVBKSB to solve for the vector $[a_i, b_i]$.

The problem becomes much more complicated when one fits for both patterns and basis functions. In this case, Eq. 1 becomes.

$$\begin{bmatrix} I_1^1 \\ I_1^2 \\ I_1^3 \\ I_2^1 \\ I_2^2 \\ I_2^3 \\ I_3^1 \\ I_3^2 \\ I_3^3 \end{bmatrix} = \begin{bmatrix} a_1 & 0 & 0 & b_1 & 0 & 0 & J_C^1 & 0 & 0 & J_D^1 & 0 & 0 \\ 0 & a_1 & 0 & 0 & b_1 & 0 & J_C^2 & 0 & 0 & J_D^2 & 0 & 0 \\ 0 & 0 & a_1 & 0 & 0 & b_1 & J_C^3 & 0 & 0 & J_D^3 & 0 & 0 \\ a_2 & 0 & 0 & b_2 & 0 & 0 & 0 & J_C^1 & 0 & 0 & J_D^1 & 0 \\ 0 & a_2 & 0 & 0 & b_2 & 0 & 0 & J_C^2 & 0 & 0 & J_D^2 & 0 \\ 0 & 0 & a_2 & 0 & 0 & b_2 & 0 & J_C^3 & 0 & 0 & J_D^3 & 0 \\ a_3 & 0 & 0 & b_3 & 0 & 0 & 0 & 0 & J_C^1 & 0 & 0 & J_D^1 \\ 0 & a_3 & 0 & 0 & b_3 & 0 & 0 & 0 & J_C^2 & 0 & 0 & J_D^2 \\ 0 & 0 & a_3 & 0 & 0 & b_3 & 0 & 0 & J_C^3 & 0 & 0 & J_D^3 \end{bmatrix} \begin{bmatrix} J_A^1 \\ J_A^2 \\ J_A^3 \\ J_B^1 \\ J_B^2 \\ J_B^3 \\ c_1 \\ c_2 \\ c_3 \\ d_1 \\ d_2 \\ d_3 \end{bmatrix} \quad (4)$$

For realistic data sets, this matrix can become quite large. In fact the number of rows, $n_r$, and the number of columns, $n_c$, for this matrix are given by $n_r$=number of spectra×number of resolution points $n_c$=(number of patterns×number of resolution points)+(number of basis×number of measured spectra) (5)

It should be pointed Out the vector on the left hand side of Eq. 4 contains all of the data. Similarly, the vector on the right of the equation contains all of pattern and basis function scaling information. Therefore, solving this problem involves calling the subroutines SVDCMP and SVBKSB only one time. Once finished, the entire problem has been solved.

The problem with the combined fit is that it is computationally intensive. The subroutine SVDCMP is very slow for large matrices. Therefore, when performing the combined fit, one should reduce the number of patterns, basis functions, measured spectra, and resolution points to a minimum.

Patterns with negative intensities are non-physical. One method for constraining all free parameters to be positive is through the use of non-linear fitting techniques. Instead of using Eq. 1 to represent the data, we shall use $$I_i^j = (a_i)^2 \cdot J_A^j + (b_i)^2 \cdot J_B^j + c_i \cdot (J_C^j)^2 +, \quad (6)$$

Here, all of the free parameters have been given a bold font. XCC uses the subroutine MRQMIN to solve for the parameters ($a_i$, $b_i$, and $J_C^j$) which satisfy the above equation. Once these parameters are found, the pattern is given by $(J_C^j)^2$.

There are a few disadvantages to the least-squares unmixing techniques. First, linear unmixing can produce negative, non-physical, results. Second, the combined (basis function and pattern) fit is computationally intensive, and consequently, difficult to use with large data sets. A third disadvantage is that least-squares methods are global techniques. This is contrary to the philosophy of the XCC algorithm which uses a local fitting technique to determine endmembers. Ideally, one should use a localized technique to unmix the endmembers found by the XCC algorithm.

Proposed here is an alternative technique, which overcomes many of the difficulties mentioned above. It should be pointed out, that this new method is not as well understood as the least-squares methods. I have not had enough time to fully test the stability and effectiveness of this approach, but initial indications suggest that this new method performs reasonably well whenever the patterns are not highly overlapped.

The new unmixing algorithm is based upon the work of G. D'Agostini [7]. In his paper, he presents a method which iteratively uses Bayes' theorem to remove detector smearing and resolution effects from measured experimental data. I have modified these ideas for our use in hyperspectral pattern unmixing.

Before delving into Bayesian unmixing techniques, it is worth while to review some basic probability concepts. Here, I will attempt to keep mathematical symbolism to a minimum. Instead, I will concentrate on using concrete examples to describe the basic concepts. Further, I will attempt to explain how spectroscopic and hyperspectral data can be reformulated in terms of these probabilities. More detailed descriptions of probability theory can be found in any of the standard texts (Eg. [8]).

An unconditional probability can be defined in terms of an experiment which has many possible outcomes (or events). The probability for event X, p(X), is simply the likelihood that out of all possible events, X occurs. A simple example is the toss of coin, where the probability that the coin lands 'heads up' is ½

Spectroscopic data can also be written in terms of such probabilities. As an example, refer to the top plot of FIG. 1, and let us suppose that this represents spectroscopic data plotted as a function of wavenumber. The spectrum represents a histogram of the various photons produced in the experiment. This 'photon distribution' can be turned into a probability distribution by simply normalizing the distribution:

$$\sum_{i=1}^{n} p(A_i) = 1 \qquad (7)$$

For example, the probability that a photon will be measured in bin 2 is given by 5/12. Of course, this is only an approximation of the true probability. In order to measure the true probability function, the 'photon distribution' in FIG. 1 would require infinite statistics.

Conditional probabilities define the likeliness that an event will occur given some prior condition. Again, a coin toss can be used to illustrate this idea. The probability that the coin will land 'heads up' given that it is a two-headed coin is equal to 1. Symbolically, this can be written as p(H|T), where H is represents the coin landing 'heads up', and T represents the fact that we are using a trick coin.

Characteristic of the conditional probability is the following normalization condition:

$$p(A) = \sum_{i=1}^{n} p(E_i)p(A \backslash E_i). \qquad (8)$$

Essentially this normalization condition states that one converts a conditional probability into an unconditional probability by summing over all of the possible conditions. Bayesian unmixing relies upon this normalization condition.

The synthetic spectroscopic data shown in FIG. 1 can also be used to demonstrate unconditional probabilities. The top plot of FIG. 1 represents a spectrum of measured data as a function of the four bins, labeled 1)$_i$. Let us further suppose that this measured data is a linear combination of two distinct spectral patterns (middle and bottoms plots). Each of these patterns were produced by separate processes within the experiment, and each has a unique spectral signature. Thus, the measured spectrum (top plot) is a bin-by-bin linear combination of these two patterns (bottom two plots).

$p(D_i|P_j)$ is the probability that one will measure a photon in bin $D_i$ given that a 'single photon' was produced in bin $P_j$. A few examples of this are:

$p(D_2|P_3)=0$ $p(D_2|P_2)=1$ $p(D_2|P_6)=1.$ (9)

Notice that these probabilities satisfy the normalization condition given by Eq. 8.

$$p(D_2) = \sum_{j=1}^{8} p(P_j)p(D_2 | P_j) \qquad (10)$$

$$= p(P_2)p(D_2 | P_2) + p(P_6)p(D_2 | P_6)$$

$$= \left(\frac{4}{12}\right)(1) + \left(\frac{1}{12}\right)(1) = \frac{5}{12} \qquad (11)$$

$p(P_j|D_i)$ represents the probability that a photon was produced by pattern $P_j$ given that a 'single photon' has been measured in bin $D_i$. Some numerical examples are:

$p(P_2|D_2)=\frac{4}{5}$ $p(P_6|D_2)=\frac{1}{5}$ $p(P_6|D_3)=0.$ (12)

As before, these probabilities satisfy the normalization condition.

$$p(P_2) = \sum_{i=1}^{4} p(D_i)p(P_2 | D_i) \qquad (13)$$

$$= p(D_2)p(P_2 | D_2) = \frac{5}{12}\frac{4}{5} = \frac{1}{3}.$$

Bayes' theorem is:

$$p(P_i | D_j) = \frac{p(D_j | P_i) \cdot p_0(P_i)}{\sum_{l=1}^{n_P} p(D_j | P_l) \cdot p_0(P_l)}. \qquad (14)$$

D and P can be thought of as a set of conditions (or events) with $n_D$ and $n_P$ elements in each. The individual elements of these sets are denoted by $D_j$ and $P_i$ respectively. In simple terms, Bayes' theorem tells one how to 'invert' conditional probabilities.

Note that Bayesian inversion is mathematically very different than matrix inversion. Bayes' theorem uses a priori information about the system, $p_o(P_i)$, to perform the inversion. $p_o(P_i)$ which are small contribute little to the resulting $p(P_i|D_j)$. Thus, Bayes' theorem can be used as a type of localized-inversion technique. Outlying points, which have small values for $p_o(P_i)$, will contribute very little to the inversion.

Once $p(P_i|D_i)$ has been calculated for a given experiment, it is easy to unmix a data set. Let D represent the set of all measured data, and let P represents the set of all the patterns. Given a measured data distribution, $n(D_j)$, the unmixed patterns are found by $$n(P_i) = \sum_{j=1}^{n_D} p(P_i \mid D_j) \cdot n(D_j). \tag{15}$$

Unfortunately, Eq. 14 tells us that it is impossible to directly calculate $p(P_i|D_j)$ without first knowing $p_o(P_i)$ which is the pattern distribution. After all, if $p_o(P_i)$ were known, there would be no point to this exercise, because the desired patterns would calculating $p(P_i|D_j)$:

1. Build $p(D_j|P_i)$ from our knowledge of how the expected patterns contribute to the measured data.
2. Assume a reasonable distribution for $p_o(P_i)$. If this is not possible, use a uniform distribution. This assumes that we have no prior knowledge of the patterns.
3. Use Eq. 14 to calculate $p(P_i|D_j)$.
4. Use Eq. 15 to calculate an approximate pattern distribution, $n(P_i)$.
5. Normalize $n(P_i)$ to create a new approximation to $p_o(P_i)$.
6. Using the new $p_o(P_i)$, repeat steps 3–5. Continue iterating until some convergence criteria is met.

These steps will be discussed in more detail in the following sections.

The sample data set given at the beginning of Appendix C will now be used to give a detailed illustration of the Bayesian technique. To begin, Eq. 1 is rearranged by summing over each of the measured spectra.

$$\overline{I^j} = \overline{a_i} \cdot J_A^j + \overline{b_i} \cdot J_B^j + \overline{c_i} \cdot J_C^j + \ldots \tag{16}$$

This equation can then be placed into matrix form:

$$\begin{bmatrix} \overline{I_1^1} \\ \overline{I_1^2} \\ \overline{I_1^3} \end{bmatrix} = \begin{bmatrix} \overline{a_i} & 0 & 0 & \overline{b_i} & 0 & 0 & J_C^1 & J_D^1 \\ 0 & \overline{a_i} & 0 & 0 & \overline{b_i} & 0 & J_C^2 & J_D^2 \\ 0 & 0 & \overline{a_i} & 0 & 0 & \overline{b_i} & J_C^3 & J_D^3 \end{bmatrix} \begin{bmatrix} J_A^1 \\ J_A^2 \\ J_A^3 \\ J_B^1 \\ J_B^2 \\ J_C^3 \\ \overline{c_i} \\ \overline{d_i} \end{bmatrix} \tag{17}$$

Each row of this matrix represents a different measured resolution point, j. It should be noted that the Bayesian method can also be used with the full matrix given in Eq. 4. However, the matrix presented here was chosen because fewer floating point operations are required to perform the unmixing. Thus, this method was expected to require less processing time.

In shorthand notation, Eq. 17 can be written as $$n(D_j) = \sum_{i=1}^{np} M(D_j \mid P_i) \cdot n(P_i) \tag{18}$$

I have chosen a notation that is suggestive of how the matrix, $M(D_j|P_i)$, can be converted into a conditional probability.

The $M(D_j|P_i)$ matrix is essentially an unnormamalized conditional probability. Thus, instead of satisfying the normalization condition given in Eq. 8, $M(D_j|P_i)$ satisfies:

$$\sum_{i=1}^{np} p(P_i) M(D_j \mid P_i) \equiv m_j. \tag{19}$$

Multiplying this equation by $p(D_j)/m_j$ and combining it with Eq. 8 gives:

$$p(D_j \mid P_i) = \frac{p(D_j)}{m_j} M(D_j \mid P_i). \tag{20}$$

Substituting Eq. 20 into Bayes' theorem, Eq. 14, yields:

$$p(P_i \mid D_j) = \frac{\left[\frac{p(D_i)}{m_j} M(D_j \mid P_i)\right] p_0(P_i)}{\sum_{l=1}^{N_D} \left[\frac{p(D_l)}{n_j} M(D_j \mid P_l)\right] p_0(P_l)} \tag{21}$$

$$= \frac{M(D_j \mid P_i) p_o(P_i)}{\sum_{l=1}^{n_D} M(D_j \mid P_l) p_0(P_l)}$$

With Bayes' theorem written in this form, it is no longer necessary to directly calculate $p(D_j|P_i)$. Also, notice that this last equation depends upon $p_o(P_i)$. $p_o(P_i)$ contains our a' priori knowledge of the unmixed spectra. The following section describes in detail how knowledge of the experimental data can be used to build an appropriate $p_o(P_i)$ vector.

When building $p_o(P_i)$, it is helpful to understand the physical interpretation of this vector. For the purposes of this discussion, let us assume that we are dealing with a time-resolved spectroscopy experiment. At different points in time, a spectrum, as a function of wavelength, is recorded. Let us further assume that each measured spectrum is composed of a linear combination of four different patterns (A, B, C, and D). In a classical sense, the photons produced in the experiment will have been produced by one of the physical processes which is described by one of the four patterns. So, in some sense, each photon 'belongs' to one of the patterns. For each photon measured by the detector, there exists a probability that it was produced by pattern A, p(A). Similarly, there exist probabilities that the photon belongs to any of the other patterns: p(B), p(C), and p(D).

If the patterns occur with equal probability, the individual pattern probabilities are given by $$p(A) = p(B) = p(C) = p(D) = \frac{1}{4}. \tag{22}$$

However, if the patterns do not occur with equal probability, $$A:B:C:D = r_A : r_B : r_C : r_D, \text{ where } r_A + r_B + r_C + r_D = 1, \tag{23}$$

then the individual pattern probabilities are:

$$p(A) = r_A \quad p(B) = r_B \tag{24}$$
$$p(C) = r_C \quad p(D) = r_D$$

Note that the individual pattern probabilities must be constructed such that $$p(P) = p(A) + p(B) + p(C) + p(D) = 1 \tag{25}$$

because it is assumed that the data is fully described by the patterns contained in set P.

The pattern probabilities can be further subdivided. For example, if each spectral pattern contains three wavelength bands, then there exist probabilities (p(A$_1$), p(A$_2$), p(A$_3$)) that a photon 'belonging' to pattern A falls within the i$^{th}$ wavelength-band. For consistency we require that $$p(A) = \sum_{i=1}^{3} p(A_i) = \tau_A. \quad (26)$$

Analogous equations can also be written for the remaining patterns.

There are several ways to estimate p(A$_i$). The XCC program currently uses the values of the XCC merit function to make this estimation. For each pattern, the value of the merit function, w$^i_A$, can be calculated at each of the i resolution points. Thus, one can write $$p(A_i) = \frac{\tau_A w^i_A}{W_A}, \text{ where } W_A = \sum_{i=1}^{3} w^i_A. \quad (27)$$

This method works well so long as the patterns are not heavily overlapped. Whenever overlap occurs, the individual weights, w$^i_A$, will be very small, and will no longer properly approximate p(A$_i$). This technique was originally developed for use with hyperspectral data. Since, this data is not expected to be heavily overlapped in the spatial domain, this technique works well.

Another method for assigning the p(A$_1$) was also considered, but I lacked the time to implement this in the XCC code. This method consists of using the angular distance between resolution points and the pattern direction vectors as a measure of p(A$_1$). Points close to a direction angle would be given large p(A$_1$). Conversely, points far away (in angle) would be given small p(A$_1$) values. This is essentially what the previous method does except that the exponential term in the XCC merit function falls off much more quickly than is proposed here.

Once the individual probabilities have been determined, the Full p$_o$(P$_i$) can be constructed. The example given in Eq. 17 suggests that the set of patterns, P, will consist of the following sets of events:

$$P = \{A_1, A_2, A_3, B_1, B_2, B_3, C, D\}. \quad (28)$$

Using Eqs. 24 and 27, one can write $$p_0(P_i) = \left\{ \frac{\tau_A w^1_A}{W_A}, \frac{\tau_A w^2_A}{W_A}, \frac{\tau_A w^3_A}{W_A}, \frac{\tau_B w^1_B}{W_B}, \frac{\tau_B w^2_B}{W_B}, \frac{\tau_B w^3_B}{W_B}, \tau_C, \tau_D \right\}. \quad (29)$$

Therefore, if it is assumed that the patterns occur with equal probability, P$_o$(P$_i$) can be written as $$p_0(P_i) = \left(\frac{1}{4}\right)\left\{ \frac{w^1_A}{W_A}, \frac{w^2_A}{W_A}, \frac{w^3_A}{W_A}, \frac{w^1_B}{W_B}, \frac{w^2_B}{W_B}, \frac{w^3_B}{W_B}, 1, 1 \right\}. \quad (30)$$

If more knowledge of the patterns is know, then the initial p$_o$(P$_i$) can be improved. If, for example, one knows that the patterns occur with the ratios $$A:B:C:D=(1/11):(3/11):(2/11):(5/11), \quad (31)$$

then the p$_o$(P$_i$) would be $$p_0(P_i) = \left(\frac{1}{11}\right)\left\{ \frac{w^1_A}{W_A}, \frac{w^2_A}{W_A}, \frac{w^3_A}{W_A}, \frac{3w^1_B}{W_B}, \frac{3w^2_B}{W_B}, \frac{3w^3_B}{W_B}, 2, 5 \right\}. \quad (32)$$

Now that M(D$_j$|P$_i$) and p$_o$(P$_i$) have been constructed, Eq. 21 can be used to construct p(P$_i$|D$_j$)). Next, Eq. 15 is used to calculate the unmixed patterns, n(P$_i$). One next uses this n(P$_i$) to construct a new p$_o$(P$_i$). One then proceeds in an iterative fashion until n(P$_i$) converges.

Unfortunately, it was found that this iterative approach did not work. In general, I found that when the method converged, the resulting patterns were totally unrecognizable. However, it was found that it one used an expanded version of Eq. 30 to calculate p$_o$(P$_i$) that reasonable results could be achieved after just one iteration. A behavior similar to this was noted by D'Agostini [7] when working ith low statistics data and Monte Carlo samples.

I do not fully understand why the consecutive iterations fail to converge. My suspicion is that it has something to do with the fact that the matrix in Eq. 17 was used to construct p(D$_j$|P$_i$) instead of the larger matrix in Eq. 4. The smaller matrix is heavily underdetermined in that there are fewer knowns (average measured spectra variables) than unknowns (pattern variables). Least-squares techniques generally fail with such systems, but the Bayesian method produces reasonable results after its first iteration. I believe that this is because the first iteration is heavily influenced by the input p$_o$(P$_i$). Therefore, the patterns found by the first iteration will be very similar to the original p$_o$(P$_i$). Since the technique presented here uses the XCC weights to estimate the original p$_o$(P$_i$), the method gives good answers after only one iteration. Further iterations produce patterns which quickly diverge away from this solution, because the underdetermined solution space is simply too large.

One way to solve this problem is to use Eq. 4 to create p(D$_j$|P$_i$). More than likely, this will lead to more stable solutions which successfully converge after a few iterations. However, since this method was implemented as a fast unmixing technique for hyperspectral data, I have decided not to do this. Using the larder matrix in the unmixing would dramatically increase the number of floating point operations required for the calculation, consequently increasing the over-all data processing time. In addition, I could not afford the time required to allow the method to iterate. Therefore, since the current implementation of the Bayesian technique gives reasonable results quickly, I have decided to not make these changes.

It may prove instructive to perform studies to see if using the larger matrix (Eq. 4) improves the stability of the Bayesian method. If so, this technique may be useful for applications which are not time critical, and it may still be faster than the analogous non-linear constrained least-squares technique. Also, studies using 'truth data' need to be done to check the effectiveness of Bayesian unmixing. Preliminary studies, using synthetic spectra, show that the technique does a good job of reproducing the patterns contained within the data. However, the effectiveness of the method still needs to be verified with experimental data.

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. An automatic endmember calssification process for hyperspectral data cubes comprising the steps of:

preprocessing hyperspectral data to reduce amounts of hyperspectral data from processing loads by assigning a cutoff criteria to eliminate pixels and spectral bonds from the hyperspectral data prior to processing its output thereby a reduced hyperspectral data set; and performing pattern identification on the reduced hyperspectral data set, wherein said performing step comprises: iteratively selecting subsets of the reduced hyperspectral data set; performing pattern recognition on each subset of reduced hyperspectral data set; and classifying spatial pixels in the reduced hyperspectral data set as belonging to said patterns.

2. An automatic endmember classification process, as defined in claim 1, wherein said performing step further comprises an unmixing step that comprises a use of least squares unmixing, non-linear least-squares or Bayesian unmixing, to unmix patterns from the reduced hyperspectral data set.

3. An automatic endmember classification system for hyperspectral data cubes comprising:

a means for preprocessing hyperspectral data to reduce amounts of hyperspectral data from processing loads by assigning a cutoff criteria to eliminate pixels and spectral bonds from the hyperspectral data prior to processing its output thereby a reduced hyperspectral data set; and a means for performing pattern identification on the reduced hyperspectral data set, wherein said performing means comprises: a means for iteratively selecting subsets of the reduced hyperspectral data set; performing pattern recognition on each subset of reduced hyperspectral data set; and a means for classifying spatial pixels in the reduced hyperspectral data set as belonging to said patterns.

4. An automatic endmember classification system, as defined in claim 3, wherein said performing means further comprises:

an unmixing means that comprises a use of least squares unmixing, non-linear least-squares, or Bayesian unmixing to unmix patterns from the reduced hyperspectral data set.

* * * * *